Dec. 24, 1968    R. E. BOWLES ET AL    3,417,624
FLUID VORTEX TRANSDUCER
Original Filed Aug. 11. 1960    3 Sheets-Sheet 1

Inventors
ROMALD E. BOWLES
& BILLY M. HORTON

By Hurvitz & Rose
Attorneys

Dec. 24, 1968   R. E. BOWLES ET AL   3,417,624
FLUID VORTEX TRANSDUCER
Original Filed Aug. 11, 1960   3 Sheets-Sheet 2

Inventors
ROMALD E. BOWLES
& BILLY M. HORTON
By Hurvitz & Rose
Attorneys

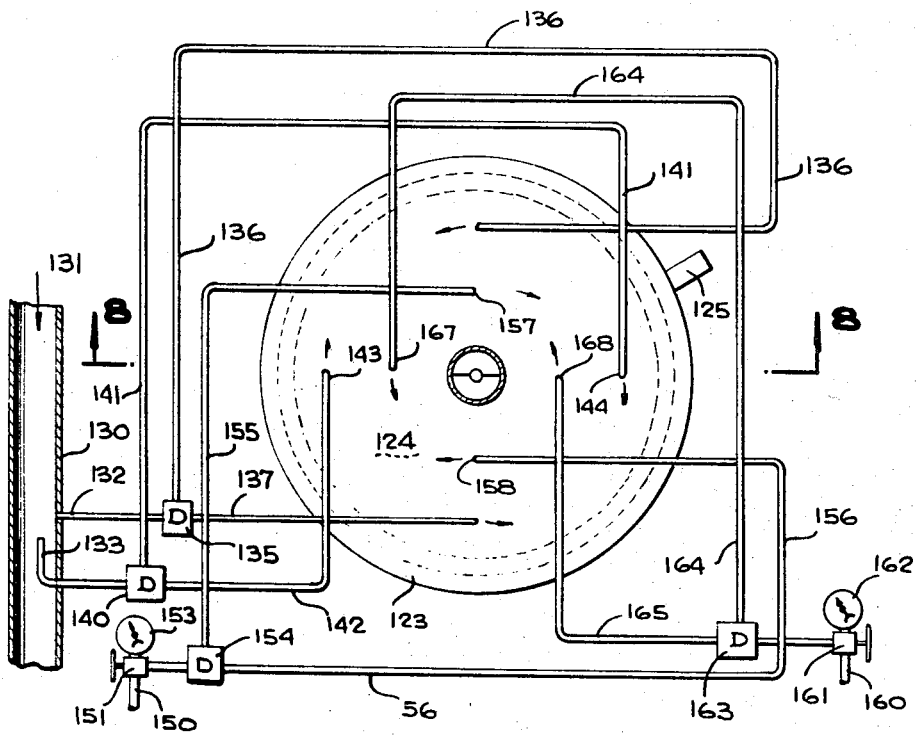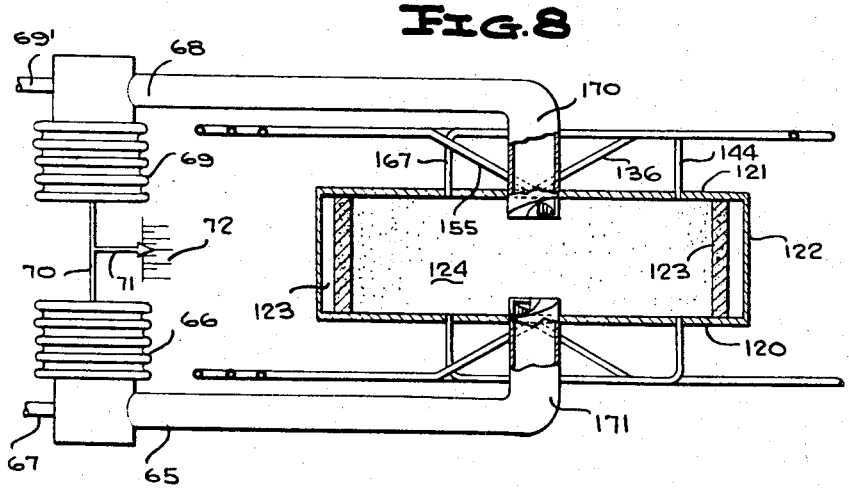

3,417,624
FLUID VORTEX TRANSDUCER

Romald E. Bowles, 12712 Meadowood Drive, Silver Spring, Md. 20904, and Billy M. Horton, 9712 Kensington Parkway, Kensington, Md. 20795
Application Feb. 23, 1965, Ser. No. 439,500, now Patent No. 3,276,259, dated Oct. 4, 1966, which is a continuation of application Ser. No. 49,601, Aug. 11, 1960. Divided and this application Apr. 19, 1966, Ser. No. 543,722
16 Claims. (Cl. 73—432)

ABSTRACT OF THE DISCLOSURE

The invention provides a vortex chamber into which fluid is introduced radially so as to flow to an egress orifice coaxial with the chamber. A rotary device is located downstream of the egress orifice so as to rotate in a sense and at a velocity determined by the sense and rate of rotation of fluid in the egress orifice. The rate and sense of rotation of the device is converted to an electrical signal by a generator driven by the rotary device.

---

This application is a division of U.S. application Ser. No. 439,500, filed Feb. 23, 1965, in the names of Romald E. Bowles and Billy M. Horton and entitled, "Fluid Amplifier," now Patent No. 3,276,259 which was a continuation of U.S. application Ser. No. 49,061 filed Aug. 11, 1960, now abandoned.

This invention relates to "fluid vortex amplifiers," which utilize the flow of fluid, fluid characteristics, and fluid flow characteristics to amplify an input signal. In general, the vortex amplifier of the present invention does not require moving mechanical parts other than the moving fluid itself. This is advantageous in that the use of moving mechanical parts limits the accuracy, reliability and utility of fluid systems to extents which vary with the particular application, because of friction, thermal expansion or deterioration, production tolerances, assembly problems, inertia or weight, response times, etc., of the moving parts. Consequently, elimination or reduction of the number of mechanically moving parts is advantageous from the viewpoint of improving reliability, ruggedness, storage life, initial cost, and simplificaton of the system.

This invention utilizes rotational flow, irrotational flow, fluid flow distribtuion, transport characteristics, boundary layer effects, pressure distribution, vanes, deflectors, surface characteristics, fluid properties, hydrostatics and fluid dynamics to achieve its objectives. The device can be considered an amplifier because the energy controlled is larger than the controlling energy. The fluid employed can be liquid, gaseous, mixtures of fluids, or combination wherein different fluids are used in different sections of the fluid vortex amplifier.

Consider a circular pan of liquid provided with a small discharge hole at the bottom center. The height of liquid in the pan results in a hydrostatic head or pressure which tends to force the fluid out of the small centrally located discharge hole. In the case of irrotational flow the fluid will flow radially towards and through the discharge hole. For an incompressible fluid the flow velocity will be inversely related to the liquid radial location. If one considers a two dimensional irrotational flow condition, as in the case of flow to a simple "sink," the radial velocity $V_r$ and the radial position $r$ will be related as in Equation 1

(1) $$V_r = \frac{\text{constant}}{r}$$

If the fluid is compressible then the local fluid density $\rho$ must be considered and Equation 1 becomes (2) $$V_r = \frac{\text{constant}}{r\rho}$$

If a tangential component of velocity is imparted to the fluid immediately adjacent to the pan rim, a fluid annulus rotates as a whole about the discharge hole as an axis, and the flow is now rotational rather than irrotational. It has been shown mathematically in numerous text books that as this annulus shrinks towards the centrally located outlet, the tangential velocity component $V_t$ for simple rotational flow is related to the radial position by Equation 3.

(3) $$V_t = \frac{\text{constant}}{r}$$

Consequently, when the fluid is discharging from the pan, as fluid moves from the rim towards the centrally located discharge hole its tangential velocity component $V_t$ increases as the radial position decreases. Ideally if one start with a 10″ diameter pan discharging through a centrally located hole of .01″ diameter the tangential velocity component at the discharge hole $V_{td}$ would be one thousand times the tangential velocity component at the rim of the pan $V_{tc}$. Thus the tangential velocity component is amplified.

While an open pan of liquid has been used to describe in elementary fashion the operation of a vortex amplifier, preferred embodiments of the invention employ a closed container or vortex chamber, wherein the fluid need not be liquid but can be a liquid or a gas or a mixture of fluid or combinations of fiuids and where the source of pressure causing fluid discharge need not be derived from gravitational effects but can be due to an initial pressurization of the vortex chamber, or to elastic deformation of the vortex chamber, or to generation of fluid pressure by addition of energy to the fluid vortex chamber, or to a replenshing flow of fluid or fluids into the vortex chamber at a radius different from the discharge radius.

It is, accordingly, a broad object of the present invention to provide a fluid vortex amplifier.

It is another object of the invention to provide a fluid vortex amplifier having provision for plural inputs at different radial distances from an output port.

It is a further object of the invention to provide systems for measuring rotary velocity of fluid flow from a vortex amplifier output port.

Still another object of the present invention is to provide a system for biasing a vortex amplifier.

A further object of the invention resides in the provision of a differential vortex amplifier.

Another object of the invention is to provide a vortex amplifier having a multiplicity of inputs at different radii.

A further object of the invention is to provide a device for measuring both the sense and magnitude of rotation of fluid flowing from the output port of a fluid amplifier.

The above and still further objects, features and advantages of the present invention will become apparent upon consideration of the following detailed description of one specific embodiment thereof, especially when taken in conjunction with the accompanying drawings, wherein:

FIGURE 7 is a view in plan of a multiple input fluid vortex amplifier; and

FIGURE 8 is a view in section taken on the line 8—8 of FIGURE 7.

Figure 1:
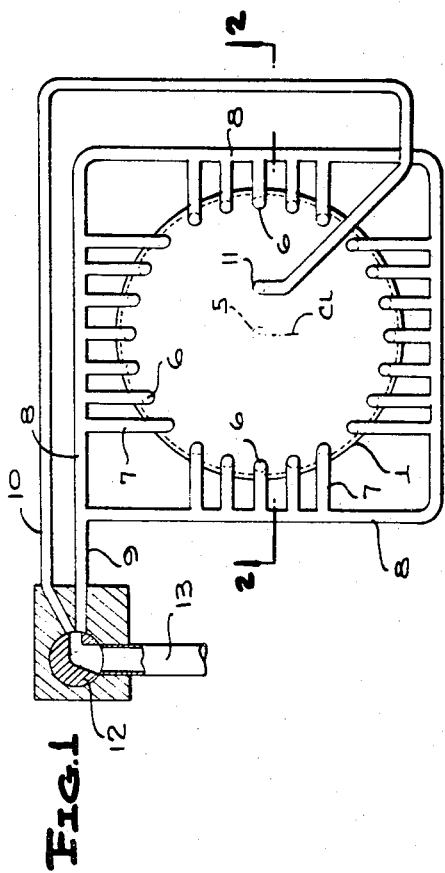
FIGURE 1 is a view in plan of a first embodiment of the vortex fluid amplifier of the present invention.
Figure 2:
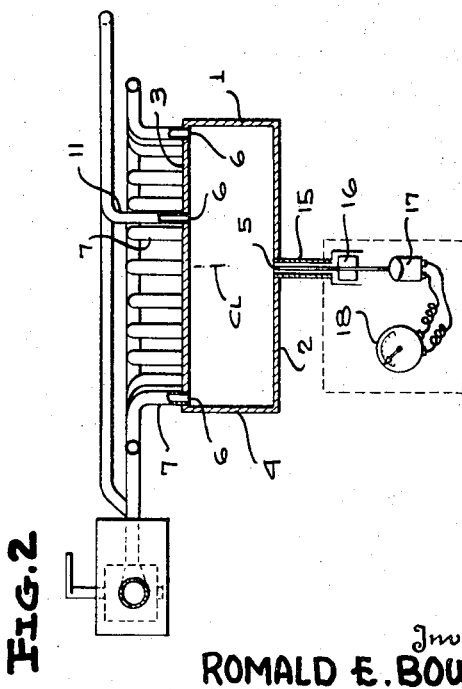
FIGURE 2 is a view in section, taken on the line 2—2 of FIGURE 1.

Referring now more particularly to FIGURES 1 and 2 of the accompanying drawings, the reference numeral CL refers to the center line, or the center of axial symmetry, of a vortex chamber 1. The vortex chamber 1 is a generally closed cylindrical structure having a base 2, a top wall 3 and a cylindrical wall 4 joining the base 2 and the top wall 3. An egress discharge or output port or opening 5 is provided in the base 2 and is located symmetrically of the latter, being centered on the center line CL of the vortex chamber 1.

Distributed about the top wall 3 are input openings 6, the distribution being equi-angular and at approximately the maximum radius available within the vortex chamber 1. Communicating with the openings 6 are supply lines 7 in the form of tubes terminating at the openings 6 and each extending perpendicularly of the top wall 3. The tubes 7 supply fluid to the vortex chamber 1 via the openings 6 which are arranged to be perpendicular with respect to the top wall 3 so that they will introduce no relative tangential velocity component of fluid flow. The precise number of tubes 7 which is utilized in any specific embodiment of the invention represent a matter of engineering choice, but a considerable number is desirable in order that random relative tangential flow of fluid may be avoided. In the specific embodiment illustrated 24 such tubes are provided. The tubes 7 are supplied with fluid by means of manifolds 8, all of which communicate with a main supply line or conduit 9. An alternative conduit 10 supplies fluid to still a further supply line 11 located at a different radius than are the supply lines 7. Fluid is supplied to the main supply lines 9 and 10 via a proportioning valve 12 from a tube 13, which is connected to a source of fluid under pressure, such as a pump or other convenient device (not shown). The proportioning valve 12 permits of controlling the proportion of fluid provided via tube 13 to the manifolds 9 and 10, and accordingly permits control of relative fluid flow through the supply lines 7 and 11, respectively. These, being at different radii, respectively, induce different velocities of fluid flow at the center line CL, or at the outlet port 5, and the resultant rotary velocity of fluid at the outlet port 5, in response to any tangential flow induced in the chamber 1, by any means, is accordingly controllable by manipulation of the proportioning valve 12.

So long as no tangential or rotary component of fluid flow is introduced into the vortex chamber 1 the flow will be radial toward the outlet port 5. Any tangential component of flow within the chamber 1, which may be introduced in any manner whatsoever, at a radius within the chamber 1 which is greater than the radius of the outlet port 5, will cause an amplified rotary flow at the outlet port 5, i.e. the flow at the port 5 will rotate more rapidly than does the flow at any point within the chamber having a greater radius than does port 5.

The output port 5 is connected to a pipe 15 within which is located a paddle wheel consisting of flat planes which intercept on a line coincident with CL. The paddle wheel 16 is mechanically coupled to a small D.C. generator 17, which has a voltage output depending upon speed and sense of rotation, but which requires essentially negligible power for driving purposes. The generator 17 is connected to an indicator 18, which may be a voltmeter, and which accordingly is capable of being calibrated in terms of the rotary velocity of the paddle 16, to indicate both sense and magnitude thereof. The paddle 16 is stationary so long as the flow of fluid through the port 5 is radial, i.e. contains no rotary component, and the voltmeter 18 accordingly reads zero. When however a rotary component exists the paddle wheel 16 is rotated thereby, and drives the generator 17 at a proportional or equal velocity, and the latter provides a voltage to the voltmeter 18 which can be read against a scale calibrated in terms of rotary velocity, and having a polarity determined by sense of rotation.

Reviewing now the operation of the system of FIGURES 1 and 2, and describing same in mathematical terms, in FIGURES 1 and 2, the vortex chamber 1 is substantially a circular cylinder provided with a discharge orifice or port 5, located at the cylinder's longitudinal axis CL. The discharge fluid stream will rotate about the vortex chamber axis CL with a tangential velocity component governed by Equation 3 and by any tangential velocity component introduced into the vortex chamber fluid. If this tangential velocity component is introduced as the fluid enters the chamber as $V_{ti}$, or initial tangential velocity component, then the condition at discharge $V_{td}$ is given by Equation 4

(4)
$$V_{td} = \frac{r_i}{r_d} V_{ti} \eta$$

Where $r_i$ and $r_d$ are the radial locations of the inlet and discharge with respect to the centerline CL and where $\eta$ is a nonlinear modification introduced by viscous forces and is equal to one in the absence of viscosity.

Pressurized fluid is supplied by proportioning valve 12 to distribution manifolds 9 and 10 and thence to paths 7 and 11. The openings 6 and the exit of path 11 are so oriented and shaped that they do not provide a relative flow velocity component which rotates about the vortex chamber longitudinal axis CL. The manifold 8 and paths 7 are shaped and connected so as to avoid introducing an initial relative rotational flow when fluid enters the vortex chamber 1. We may now assume that tangential components of velocity are imparted to the fluid, in any desired fashion. If $r_5$ is the radial location of the distribution paths 7 and if $r_d$ is the radial location of the fluid discharging from the vortex chamber 1 then the tangential velocity components $V_{t5}$ and $V_{td}$ at radius $r_5$ and $r_d$ respectively are related as in Equation 5 where $\eta$ is a modification introduced by viscous forces (5)
$$\frac{V_{td}}{V_{t5}} = \frac{r_5}{r_d} (\eta)$$

We provide an additional distribution path such as 11 at radial location $r_6$ from the vortex chamber centerline CL. Obviously several such may be provided. If there is flow only from distribution paths at radial location $r_6$ then the tangential velocity components will be related by Equation 6

(6)
$$\frac{V_{td}}{V_{t6}} = \frac{r_6}{r_d} (\eta)$$

Consider a condition wherein the fluid in the vortex chamber at its outermost radius is rotating at a constant angular rate (7)
$$\frac{do}{dt} = W_b$$

In order to develop a useful output signal from the apparatus means must be provided for monitoring the tangential velocity component at the discharge $V_{td}$. One extremely simple monitoring method is to place a paddle wheel 16 in the discharge stream with the paddle wheel axis of rotation coincident with and parallel with the vortex chamber axis CL and with paddle wheel blades which are flat planes passing through the paddlewheel axis of rotation. Then the angular rotation rate of the paddle wheel, $W_p$, will be related to the discharge tangential velocity component $V_{td}$ by Equation 8

(8)
$$W_p = \frac{KV_{td}}{r_d} \text{ (radians per second)}$$

K is substantially a constant and is approximately equal to unity.

If the valve 12 which supplies fluid to the vortex amplifier directs all of the fluid to distribution paths 7, then (9) $$V_{t5} = r_5 W_b$$

(10) $$V_{td} = \frac{r_5}{r_d} \eta r_5 W_b$$

(11) $$W_p = \left(\frac{r_5}{r_d}\right)^2 \eta K W_b$$

And because the values $r_5$ and $r_d$ are fixed and the values K and $\eta$ are approximately constant then if $\eta \doteq 1 \doteq K$ then let

(12) $$A = \left(\frac{r_5}{r_d}\right)^2$$

and

(13) $$W_p = A W_b K$$

In FIGURE 1, $r_5 > r_d$ such that $A > 1$ and the amplitude of $W_p > W_b$. It is apparent to one skilled in the art that the discharge can be through an annular ring and a model can be constructed wherein $r_5$ is less than $r_d$, such that $A < 1$.

If the valve 12 which supplies fluid to the vortex amplifier directs all of the fluid to distribution path 11 then one finds that, by analogy with Equation 11, $W_p$ depends upon the inlet radial position $r_6$, the discharge radial position $r_d$, the monitor coefficient K, the viscosity modification within the vortex chamber $\eta$, and the angular rate of rotation of the fluid at radius $r_6 W_b$.

(14) $$W_p = \left(\frac{r_6}{r_d}\right)^2 K \eta W_6$$

(15) $$W_p = B W_b K \eta$$

Thus, one is able to employ the embodiment of FIGURE 1 as a multiplier and by controlling the radial location at which fluid is introduced, one is able to change the multiplication coefficient, as illustrated above, from value A to value B, or, similarly, to any other fixed value.

It is also possible to proportionally supply fluid to inlets or distribution paths at several radial locations simultaneously. In such cases the momentum exchange between fluid introduced at a large radial location $r_5$ and fluid introduced at a smaller radial location $r_6$ must be considered.

Let $\dot{m}_5$ indicate the mass flow rate of fluid introduced at $r_5$ and let $\dot{m}_6$ indicate the mass flow rate of fluid introduced at $r_6$.

By the time it gets to location $r_6$ the mass $\dot{m}_5$ has a radial velocity component based on Equation 2 and conservation of mass as follows

(16) $$\dot{m} = \rho V A'$$

(17) $$\dot{m}_5 = \rho m_{5,5} V_{r_5} 2\pi r_5 h$$

Wherein $\rho m_{5,5}$ is density of $m_5$ at position $r_5$
$V_{r_5}$ is radial velocity at $r_5$
$h$ is height of vortex chamber
$A'$ is radial flow area $2\pi r h$

(18) $$V_{r_5} = \frac{\dot{m}_5}{\rho m_{5,5} 2\pi r_5 h}$$

At position $r_{(6+\epsilon)}$ a radial location slightly greater than $r_6$

(19) $$V_{r_{(6+\epsilon)}} \doteq \frac{1}{\rho m_{5,6} r_6} \frac{\dot{m}_5}{2\pi h}$$

The tangential fluid velocity of $\dot{m}_5$ at $r_{(6+\epsilon)}$ is

(20) $$V_{t_{(6+\epsilon)}} \doteq \frac{r_5}{r_6} \eta r_5 W_b$$

The velocity of $\dot{m}_5$ at locations $r_6 + \epsilon$ is therefore

(21) $$V_{(6+\epsilon)} = \sqrt{V_{r_{(6+\epsilon)}}^2 + V_{t_{(6+\epsilon)}}^2}$$

(22) $$V_{(6+\epsilon)} \doteq \sqrt{\left(\frac{\dot{m}_5}{m_{5,6} 2\pi h r_6}\right)^2 + \left(\frac{r_5^2 \eta_1 W_b^2}{r_6}\right)^2}$$

The tangential momentum component of $\dot{m}_5$ at $r_6 + \epsilon$ is

(23) $$P_{t_{5,6}} = \dot{m}_5 V_{t_6}$$

(24) $$P_{t_{5,6}} = \dot{m}_5 \frac{r_5^2}{r_6} \eta_1 W_b$$

The tangential velocity of $\dot{m}_6$ at $r_6$ is

(25) $$V_{t_{6,6}} = r_6 W_b$$

The tangential momentum of $\dot{m}_6 r_6$

(26) $$P_{t_{6,6}} = \dot{m}_6 r_6 W_b$$

The combined tangential momentum at $r_{6-\epsilon}$ is

(27) $$P_{t_6} = P_{t_{5,6}} + P_{t_{6,6}}$$

(28) $$P_{t_6} = \frac{W_b}{r_6} (\dot{m}_5 \eta_1 r_5^2 + \dot{m}_6 r_6^2)$$

The tangential velocity component of the combined flow is

(29) $$V_{t_{(6-\epsilon)}} = \frac{P_{t_6}}{(\dot{m}_5 + \dot{m}_6)}$$

(30) $$V_{t_{(6-\epsilon)}} = \frac{W_b(\dot{m}_5 \eta_1 r_5^2 + \dot{m}_6 r_6^2)}{r_6(\dot{m}_5 + \dot{m}_6)}$$

Based on Equations 4 and 30 the discharge tangential velocity component $V_{td}$ is

(31) $$V_{td} = \frac{W_b \eta_2 (\dot{m}_5 \eta_1 r_5^2 + \dot{m}_6 r_6^2)}{r_d (\dot{m}_5 + \dot{m}_6)}$$

and $W\rho$ is given by

(32) $$W\rho = \frac{K W_b \eta_2 (\dot{m}_5 \eta_1 r_5^2 + \dot{m}_6 r_6^2)}{r_d^2 (\dot{m}_5 + \dot{m}_6)}$$

(33) $$W\rho = \frac{\left(\frac{\dot{m}_5}{\dot{m}_6} \eta_1 r_5^2 + r_6^2\right)(K W_b \eta_2)}{\left(\frac{\dot{m}_5}{\dot{m}_6} + 1\right) r_d^2}$$

(34) $$W\rho = \left[\frac{\frac{\dot{m}_5}{\dot{m}_6} \eta_1 \left(\frac{r_5}{r_d}\right)^2 + \left(\frac{r_6}{r_d}\right)^2}{\left(\frac{\dot{m}_5}{\dot{m}_6}\right) + 1}\right] K W_b \eta_2$$

Wherein $\eta_1$ represents the viscous force modification of the idealized flow between radial locations $r_5$ and $r_6$ and wherein $\eta_2$ represents the viscous force modification of the idealized flow between radial locations $r_6$ and $r_d$. Comparison with Equations 13 and 15 is instructive.

(35) $$\text{let } \dot{m}_r = \frac{\dot{m}_5}{\dot{m}_6}$$

(36) $$W\rho = \left[\frac{\dot{m}_r \eta_1 A + B}{\dot{m}_r + 1}\right] \eta_2 K W_b$$

Consider the simplified case where $$\eta_4 \doteq \eta_2 \doteq 1$$

Then

(37) $$W\rho \doteq \left[\frac{\dot{m}_r A + B}{\dot{m}_d + 1}\right] K W_b$$

Or

(38) $$W\rho \doteq \left[\frac{\dot{m}_5 A + \dot{m}_6 B}{\dot{m}_5 + \dot{m}_6}\right] K W_b$$

It is apparent that a similar analysis can be readily accomplished when fluid is introduced at more than two radial locations. It is also apparent that discharge can be at more than one radial location if desired, as a means of reducing the number of units required in a system.

Figure 3:
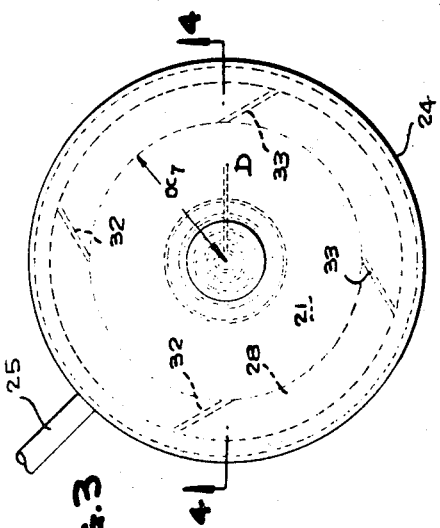
FIGURE 3 is a view in plan of a modification of the system of FIGURE 1.
Figure 4:
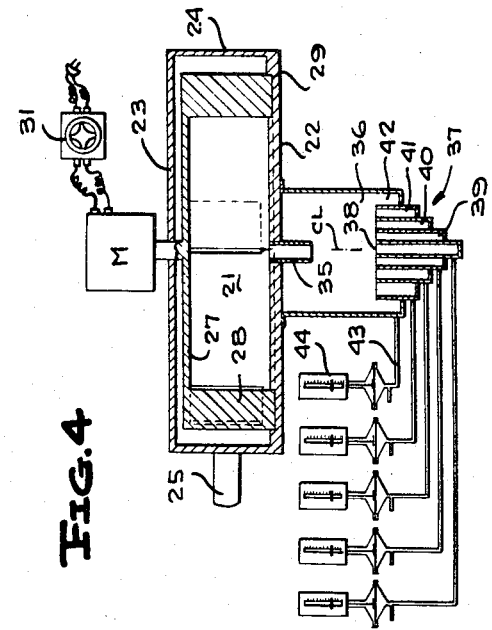
FIGURE 4 is a view in section, taken on the line 4—4 of FIGURE 3.

Referring now more particularly to FIGURES 3 and 4 of the accompanying drawings, CL again represents the center line of a chamber 21 having a base 22 and a top wall 23 joined by a cylindrical wall 24, forming a substantially closed hollow cylindrical enclosure. Pressurized fluid is supplied to the chamber 21 via a radially extending pipe 25, terminating at cylindrical wall 24. Located within the chamber 21 is a further chamber 26 comprised of a disc like top wall 27 extending parallel with and slightly spaced from top wall 23, and an annular or cylindrical wall 28 extending parallel to and within the wall 24 of the chamber 21. The lower annular edge or rim of the annular member 28 rides within an annular groove 29 in the inward surface of the base 22 of the chamber 21. The annular ring 28 and its closure disc 27 are driven by means of a motor M, mechanically coupled to the center line of the top wall 27. The motor M is driven at variable speeds from a source of voltage 30, via a voltage or speed regulator 31. Fluid supplied through the pipe 25 enters the annular chamber existing between the cylindrical walls 24 and 28 by virtue of the spacing therebetween, and provides a fluid pressure head therein. Communication through the annular wall 28, from the annular distribution chamber 21 formed by walls 24, 25 and the cylindrical vortex chamber 26 located interiorly of annular wall 28 is provided by means of slots 32 and 33, which make a common angle with respect to, but on opposite sides of, the diameter joining the outlets 34, of the slots so that fluid entering the inner chamber via the slots 32, 33 is provided with a tangential component of velocity. Since the angles which the slots 32, 33 make with the diameter are equal, and since the egress points of the slots 32, 33 fall on the diameter D of chamber 26, a rotary couple is provided which is symmetrical with the respect to the center line CL.

Located in the base 22 and symmetrical with CL is an outlet or discharged orifice 35. The latter extends into a cylindrical enclosure 36, which extends downwardly of base 22. A series of annular receiving apertures 37 is provided, which extend into the enclosure 36 and which face generally the discharge orifice 35. As illustrated in the accompanying drawings, the receiving annular receiving apertures include one aperture 38 which is aligned with the discharge aperture 35, and further apertures 39, 40, 41 and 42, which are successively of greater diameters, and which surround the central aperture 38 and are symmetrical therewith. Each of the annular receiving apertures 38, 39, 40, 41 and 42 communicates via a suitable line, as 43, with a pressure actuated diaphragm type pressure indicator, as 44.

In the systems of FIGURES 3 and 4, fluid supplied via pipe 25 to the annular chamber between walls 24 and 28 flows through the slots 32 and 33 into the vortex chamber. The slots 32 and 33 are so arranged that fluid entering the vortex chamber has a tangential velocity component due to the speed of flow in slots 32 and 33, which would exist even if the latter were stationary. An additional component of tangential velocity can be produced by rotating the annular wall 28 and thereby the slots 32 and 33. This rotation is accomplished in response to the rotation of the motor M, and can be in either sense of rotation, by making the motor M reversible. Assuming that annulus 28 is rotating, the latter acts as a torsional inertia with regards to flow from the annular chamber to vortex chamber 21. Because slots 32 and 33 are not radial the flow exists from these slots with a velocity which is not radial and consequently a force acts on the walls of flow paths or slots 32 and 33, tending to cause the member 28 to rotate or increase its rate of rotation about the center line CL. The rate of rotation of member 28 will increase until the fluid exit via 35 has the same velocity vector direction as the entrance velocity vector direction for the same flow path. Thus if the main body has a rotational rate $W_b$ which is negligible, then the transient tangential velocity component $V_{t7}$ at radius $r_7$ (the exit radius of flow paths 32, 33), which results from the action of flow through paths 32, 33 in member 28 is amplified to a larger tangential velocity component at the discharge radius $r_d$ by flow through the vortex chamber.

(39)
$$V_{td} = \frac{r_7}{r_d} V_{t_7}$$

Let clockwise rotation W, be positive for FIGURE 3 and let $\alpha$ be the angle between the flow paths 32, 33 exit to chamber 21 and the corresponding radius to the centerline CL be $r_7$. Let $h_7$ be the height of vortex chamber 23 at $r_7$. Then when member 28 is thin in radial dimension

(40)
$$Vt_7 = \frac{\dot{m}_3 \tan \alpha}{2\pi r_7 h} + 2\pi r_7 W_5$$

when $\dot{m}_3$ is the volume flow rate of the system and tan $\alpha$ is negative for orientation of flow paths 22 as shown in FIGURE 3.

Let $I_5$ equal the angular moment of inertia of member 28. Then the transient is identified by the following

(41)
$$\frac{dW_5}{dt} = \frac{\dot{m}_3 V_{t_7} r_7}{I_5}$$

(42)
$$W_5 = W_{5_0} + \int_0^t \frac{\dot{m}_3 r_7}{I_5} \left( \frac{\dot{m}_3 \tan \alpha}{\rho_7 2\pi r_7 h} + 2\pi r_7 W_5 \right) dt$$

(43)
$$V_{td} = \frac{r_7}{r_d} \frac{\dot{m}_3 \tan \alpha}{\rho_7 2\pi r_7 h} + 2r_7 \left( W_{5_0} + \int_0^t \frac{\dot{m}_3 r_7}{I_5} \frac{\dot{m}_3 \tan \alpha}{\rho_7 2 r_7 h} + 2\pi r_7 W_5 \right) dt$$

It is apparent that a similar effect occurs if $\dot{m}_3$ is decreased in that the angular momentum of member 28 introduces a signal $V_{t7}$ on the reduced flow $\dot{m}_3$. If the reduced value of $\dot{m}_3$ is zero then there is no flow to discharge path 35 and except as attentuated by friction and viscous action the angular momentum of member 28 is stored until flow $\dot{m}_3$ resumes.

In some applications it is desirable to rotate member 28 through a suitable mechanical linkage in order to introduced a value of $V_{t7}$ which is related to an input signal. Unless otherwise specified the term "input signal" as used herein is a fluid signal which is intentionally supplied to the system for the purpose of instructing or commanding the system to provide a desired output signal. This input signal can be in the form of time or spatial variations in pressure, density, flow velocity, mass flow rate, fluid composition, transport properties, or other thermodynamic properties of the input fluid. The term "output signal" as used herein is a fluid signal which is provided by the system at its output. This output signal can be in the form of time or spatial variation in pressure, density, flow velocity, mass flow rate, fluid composition, transport properties, or other thermodynamic properties of the output fluid.

The rate at which fluid is rotating in proceeding from the outlet port 35 determines the solid angle of spread which the fluid will make after leaving the port 35. If the fluid is not rotating, all the fluid, or substantially all the fluid, will be directed to the central receiving aperture 38. The more rapidly the fluid is rotating the greater will be the distribution over the angular receiving ports 39 to 42. Accordingly visual observation of the measuring devices 44 will result in indication of the rotation of the fluid emitted from port 35.

If now a component of rotation of fluid within the vortex chamber is produced, in response to any type of input signal, this component can be balanced by appropriate rotation of the annular wall 28, and if the required speed of rotation of the motor M to effect balance is known, the magnitude of the input signal may also be know.

In the alternative the system may be utilized to measure the rate of rotation of the motor M, in terms of the solid angle provided by the rotating fluid emitted from the port 35, as these are indicated by the pressure measuring or indicating device 44.

Figure 5:
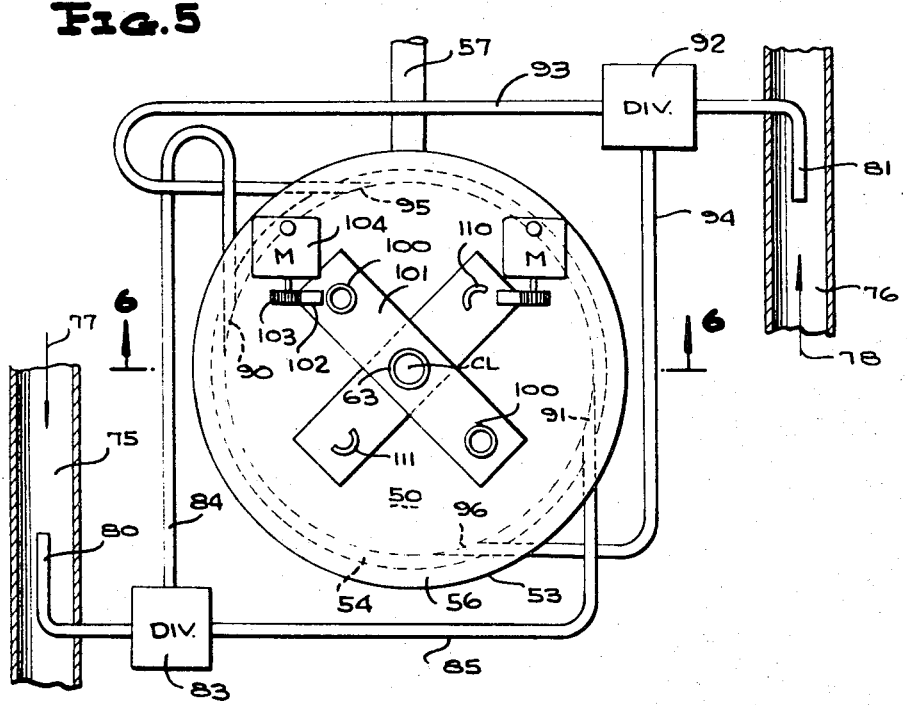
FIGURE 5 is a view in plan of a differential fluid vortex amplifier, according to the invention.
Figure 6:
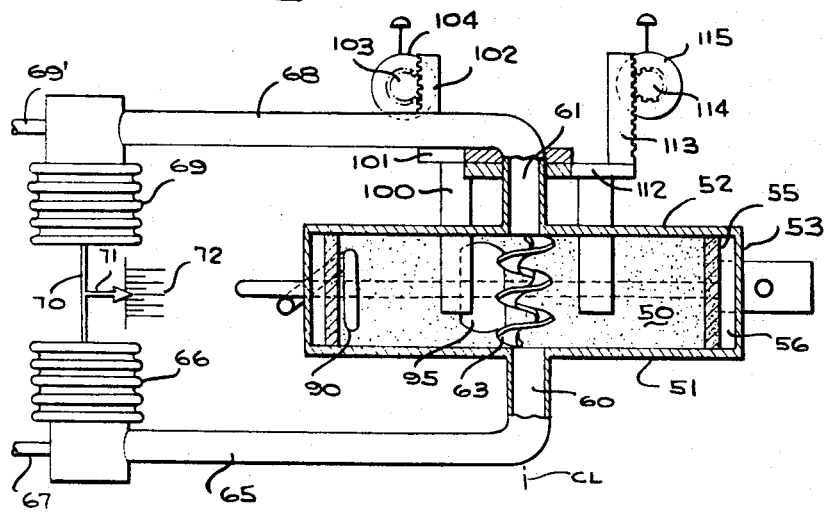
FIGURE 6 is a view in section, taken on line 6—6 of FIGURE 5.

In the system of FIGURES 5 and 6 a cylindrical chamber 50 is provided having a base 51 and a top wall 52 joined by a cylindrical wall 53 to form a closed hollow cylindrical enclosure. Within the enclosure is provided a porous cylindrical wall 55 spaced from the outer wall 53, and extending between the base 51 and the top wall 52, thereby forming an annular passageway 56 between the outer surface of wall 55 and the inner surface of wall 53. Pressure is supplied to the annular passageway 56 via a pipe 57, to which is connected a source of fluid under suitable pressure (not shown). The porous wall 55 permits fluid to flow into the chamber formed interiorly of the wall 55, but introduces sufficient resistance to flow of fluid that the entrance of fluid into the chamber formed by the wall 55, and hereinafter called the "vortex chamber," has no tangential component of velocity but does have a homogeneous radial component of velocity. Outlet ports 60 and 61 are provided in the base 51 and in the top wall 52 respectively, the outlet ports being circular and symmetrical with respect to CL, the center line of the vortex chamber. Extending between the ports 60, 61 is an Archimedes screw 63, which forms a helical deflector presenting differential impedance to the flow of fluid which is proceeding through the ports 60 and 61 with rotary component of motion. So long as the rotary component of motion corresponds in sense with the threads of Archimedes screw 63 the latter facilitates flow of fluid. When the fluid is in the opposite sense of rotation, however, the Archimedes screw 63 impedes the flow of fluid. It follows that the quantity of fluid per second which passes through the ports 60 and 61 respectively, depends upon the direction in which the fluid is rotating within the vortex chamber. Assuming that the Archimedes screw to have a clockwise direction of thread advance in proceeding from port 60 to port 61, then if the flow is clockwise flow is facilitated in passing through the port 61, and impeded in passing through the port 60. On the other hand if the direction of rotation of flow is reversed, i.e. if the Archimedes screw has a direction of advance in proceeding from port 60 to 61 which is right-handed or clockwise, the flow is left handed as seen in proceeding from the port 60 to 61, the Archimedes screw facilities flow through the port 60 but impedes flow through the port 61. The port 60 is connected via a channel 65 to an elastic bellows 66 having an overflow provision via a small restrictive passage 67. Likewise the port 61 is connected via a channel 68 to a bellows 69, having a restriction overflowing passage 69'. Bellows 66 and 69 are joined by a connecting rod 70 so that one bellows acts against the other, and the connecting rod 70 is provided with a pointer 71 moving over a scale 72, so that by observation of the position of the pointer 71 with respect to the scale 72 one may determine the relative expansions of the bellows 66 and 69. The position of the pointer 71, accordingly, establishes a measure of the sense of rotation and velocity of rotation of fluid within the vortex chamber.

Assuming that the Archimedes screw 63 is right-handed in proceeding from port 60 to port 61, and that rotary flow of fluid within the vortex chamber is right-handed, fluid flow through the port 61 and the channel 68 will be greater than is fluid flow through the port 60 and the channel 65, and accordingly bellow 69 will be under greater pressure than is bellows 66. Bellow 69 will then overcome bellow 66 and move pointer 71 downwardly to an extent which is a measure of the rotary velocity of the fluid in the vortex chamber. If the flow of the fluid in the vortex chamber is entirely radial, i.e., contains no tangential or rotary component of motion, the Archimedes screw 63 will be neutral and equal flows will occur through the ports 60 and 61 to the bellows 66 and 69. In such case the restrictive overflow passages 67 and 69' will provide equal overflows, and the bellows will provide forces against the rods 70 which are equal and opposite. The pointer 71 will then maintain a zero deflection.

Exteriorly of the chamber 50 are provided two tubes 75 and 76 in which occur fluid flows in the directions of the arrows 77 and 78, respectively. Pitot pressure tube 80 faces upstream in the tube 75 and similarly a Pitot pressure tube 81 faces upstream in the tube 76. Fluid collected by the Pitot pressure tube 80 is supplied to a divider 83, which supplies this fluid to a pair of channels 84 and 85 in equal amounts, channels 84 and 85 terminating in openings in the wall 55 the openings existing at opposite ends of a diameter, being identifiable by the reference numerals 90 and 91, and being so oriented with respect to the wall 55 as to introduce equal tangential components of fluid flow. Accordingly there is introduced into the vortex chamber a tangential component of fluid motion which has a magnitude representative of the pressure measured by the Pitot tube 80.

Similarly, the Pitot tube 81 is connected via a divider 92 to a pair of channels 93 and 94, introducing equal flows into these channels, and the channels 93 and 94 terminate in openings 95 and 96 respectively in the wall 55 of the vortex chamber. The channels 93 and 94, as they enter the wall 55, make a tangential angle with respect thereto, so as to introduce a tangential flow, and since the ingress points exist along the opposite ends of a diameter, a moment of rotation is introduced which is symmetrical about the center line CL. The sense of rotation introduced by the input nozzles 95 and 96 are opposite to those introduced by the input nozzles 90 and 91.

It follows that rotation of the vortex which is induced by the two sets of nozzles 90, 91 and 95, 96, respectively, are subtractive, and the net rotation of fluid in the vortex chamber is thus a measure of the difference in pressures and flows in the pipes or channel 75, 76 as measured by thes Pitot tubes 80, 81.

Provision is made for inserting into the vortex chamber two distinct kinds of impedances to fluid flow. One of these impedances takes the form of cylindrical rods 100 which may be inserted to varying depths into the vortex chamber and in a direction parallel to the center line CL of the chamber. By virtue of the fact that the rods are transversely cylindrical, and of the fact they are located at a smaller radius than the radius of injection of fluid with tangential component of flow by injection nozzles 90, 91 and 95, 96, the rods 100 introduce an impedance to radial flow which is the same for both directions of rotation. The rods 100 are arranged on a common diameter, so as to introduce a balanced impedance couple, and to avoid turbulence, and are mounted on a common mounting plate 101. Secured to mounting plate 101 is a rack 102, the latter being driven by a pinion 103 in response to rotation of a motor 104. By suitably energizing motor 104 the pinion 103 may be rotated and thereby drive the rack 102 vertically, concomitantly inserting the impedance rods 100 more or less into the vortex chamber, and introducing greater or smaller impedance of fluid flow in the vortex.

A second type of impedance device is provided, which is sensitive to direction of rotation of the fluid within the vortex chamber. This impedance consist of pair of rods 110, 111, mounted on a common diameter on opposite sides of the center line CL of the vortex, and at equal radii. In cross section, the rods 110 and 111 are semicircular, the convex surfaces of the rods 110, 111 facing in the same sense the clockwise rotation of the fluid, but presenting a relatively small resistance to such clockwise rotation because of the aerodynamic shape of the rods.

On the other hand, in response to counter-clockwise rotation, the rods 110, 111 are concave as seen by the fluid, and accordingly relatively high impedance to flow is introduced. As in the case of the rods 100, the rods 110 and 111 are mounted on a transverse plate 112, which serves to support both rods 110 and 111, and which is secured to a rack 113 which is driven by means of a pinion 114 in response to rotation of the drive motor 115.

The rods 100 can be used to symmetrically (while rods 110, 111 can be utilized to unsymmetrically) reduce rate of rotation within the vortex chamber of the fluid within the vortex chamber, and consequently to reduce the maximum deflection of the pointer 71, in effect reducing the total scale of magnitudes of pressures supplied to the bellows 66 and 69 to a relatively small range of values, while the pressures and flows in the tubes 75 and 76 may vary over a great range of values.

In the systems of FIGURES 7 and 8 we employ a vortex structure involving an outer cylindrical container having a bottom wall 120 and a parallel top wall 121, joined by a cylindrical wall 122 to form a substantially complete cylindrical hollow enclosure. Within the enclosure is a porous cylindrical wall 123 which extends between the base 120 and the top wall 121, but is spaced from the cylindrical wall 122 so as to form a channel 123' of annular shape, which may be utilized to supply fluid under pressure to the interior of a vortex chamber 124, formed by the interior surface of the wall 123, the base 120 and the top wall 121.

Fluid is supplied to the annular passage 123 by means of a pipe 125, and passes through the porous wall 123, entering into the vortex chamber 124 radially and with no component of relative tangential or rotary motion. A pipe 130 is provided, having therein fluid flow in a direction indicated by the arrow 131. A pressure monitor tube 132 extends through the wall of the tube 130 at right angles therewith, and accordingly transmits a pressure equal to the static pressure in the tube 130. A Pitot tube 133 is provided, with faces upstream in the conduit 130, and accordingly measures the total pressure therein. Flow in the pipe 132, representative of static pressure in the channel 130, divided equally by means of a divider 135 into two channels 136 and 137. The latter channels terminate on a common diameter of the vortex chamber 124, and at equal distances from the center line CL thereof. The nozzles of the channels 136 and 137 are directed in opposite senses, so as to effect rotation of fluid within the vortex chamber 124 in the same sense, i.e. counterclockwise as seen in FIGURE 7.

The output of Pitot tube 133 is applied to a divider 140, which divides the output of the Pitot tube 133 equally and applies the two equal portions in separate channels 141 and 142, which terminate in nozzles 143 and 144 respectively, located on a common diameter of the vortex chamber 124 at equal distances from the center line CL. The nozzles 143 and 144 inject fluid into the vortex chamber 124 in such sense as to cause clockwise rotation of fluid therein.

A source of fluid pressure 150 is provided, which is valved by means of a valve 151 and measured in respect to amplitude by means of a meter 153. The fluid passed by the valve 151 is divided in a divider 154, and equally divided fluid flows supplied via conduits 155 and 156, respectively, to nozzles 157 and 158, which tend to cause clockwise rotation of the fluid in the vortex chamber 124, by reason of their orientations and by the fact that they are at equal distances along a common diameter of the vortex. A further source of fluid under pressure, 160, is valved by means of a valve 161 and its pressure monitored by means of a meter 162. The fluid passed by the valve 161 is divided in a divider 163 into equal flows, which proceed via conduits 164 and 165 respectively to nozzles 167, 168 located on a common diameter on opposite sides of center line CL. The distance between nozzles 167 and 168 can be the same as the distance between nozzles 157 and 158, deriving from valve 151. On the other hand the distance between nozzles deriving from the Pitot tube 133 and from the static pressure tube 132 can be at equal distance separations. The Pitot tube pressure causes clockwise rotation of the fluid and the static pressure causes counterclockwise rotation. These rotations can be counter-balanced by fluid injected from the valves 151 and 161, whereof the fluid injected from the valve 151 causes clockwise rotation and that from the valve 161 counterclockwise rotation.

The total rotation within the vortex chamber 124 can be measured as in the system of FIGURES 5 and 6, if desired. However, in accordance with the embodiment of our invention illustrated in FIGURES 7 and 8, the screw of FIGURES 5 and 6 is dispensed with, and instead we utilize a pair of vertical channels or outlet ports, 170, 171, located in symmetry with center line CL, and each containing at its opening a scoop arranged to accept fluid flowing in a first direction and to reject fluid flowing in an opposite direction. The outlet or egress ports communicate with bellows as in the case of FIGURES 5 and 6, and accordingly this portion of the structure requires no further elucidation.

The system of FIGURES 7 and 8 operates to measure either total pressures or static pressures, or the difference between these, by supplying countervaling biases from the valves 151 and 161. These valves may be adjusted so as to reduce the total rotation within the vortex chamber to zero, whereupon a reading of the pressures provided by meters 153 or 162 on both of them enables a deduction as to the chamber of them or magnitude of the pressures in the channel 130.

While we have described and illustrated several specific embodiments of our invention, it will be clear that variations of the details of construction which are specifically illustrated and described may be resorted to without departing from the true spirit and scope of the invention as defined in the appended claims.

What we claim is:

1. In combination, a vortex chamber having a means for supplying fluid with substantially no tangential velocity relative to said chamber at a location having a large radial displacement from an axis of said chamber, said chamber also having an outlet aperture for fluid, said aperture being located adjacent said axis and having a radial length small relative to the aforesaid radial displacement, fluid in said chamber being responsive to external motivation to produce rotational velocity of said fluid about said axis, a rotatable member located wholly downstream of said aperture and in fluid flow communication therewith, and means for determining the rate of rotation of said rotatable member.

2. In combination, a vortex chamber having a means for supplying fluid with substantially no tangential velocity relative to said chamber at a location having a large radial displacement from an axis of said chamber, said chamber also having an outlet aperture for fluid, said aperture being located adjacent said axis and having a radial length small relative to the aforesaid radial displacement, fluid in said chamber being responsive to external motivation to produce rotational velocity of said fluid about said axis, a rotatable member located downstream of said aperture and in fluid flow communication therewith, means for determining the rate of rotation of said rotatable member, and means for developing signals indicative of the velocity and direction of rotation of said rotatable member.

3. The combination according to claim 2 wherein said means for developing generates an electrical signal.

4. The combination according to claim 2 wherein said means for developing is a rotary electrical generator.

5. The combination according to claim 3 further comprising means for inducing rotation of said fluid in said chamber.

6. In a vortex system, a cylindrical chamber of relatively large radius, means for supplying fluid irrotationally to said chamber, fluid in said chamber being responsive to external motivation to produce rotational velocity of said fluid about said axis, said chamber having at least one axial egress port having a radial length small relative to the radius of said chamber, said chamber having only fluid between said large radius and a region defined by the radius of said egress port, means for developing an electrical signal which is a function of the rate of rotation of said fluid in a region of said chamber defined generally by said egress port, and wherein said means for developing is located wholly downstream of said egress port.

7. The combination according to claim 6 wherein said means for developing includes a rotary electrical generator.

8. In a vortex system, a cylindrical chamber of relatively large radius, means for supplying fluid irrotationally to said chamber, fluid in said chamber being responsive to external motivation to produce rotational velocity of said fluid about said axis, said chamber having at least one axial egress port having a radial length small relative to the radius of said chamber, said chamber having only fluid between said large radius and a region defined by the radius of said egress port, means for developing an electrical signal which is a function of the rate of rotation of said fluid in a region of said chamber defined generally by said egress port, wherein said means for developing is located downstream of said egress port, and further comprising a passage connected in flow communication with said egress port, an enlarged region formed in said passage, said means for developing including a rotatable wheel located in said enlarged region.

9. In a fluid vortex device having a vortex chamber, said vortex chamber having an axis, fluid in said chamber being responsive to external motivation to produce a rotational velocity of said fluid about said axis, means for supplying said fluid to said chamber with substantially no rotational velocity, relative to said chamber about said axis and at a relatively large radius of said chamber, fluid outlet means located axially of said chamber and including egress orifice means having a radius smaller than said relatively large radius by a large factor, and sensing means being responsive substantially only to said rotational velocity of said fluid in said chamber about said axis in terms of a function of fluid and flow parameters, said sensing means being located wholly downstream of said egress orifice and including means for providing an electrical signal representative substantially only of said rotational velocity of said fluid wholly downstream of said chamber about said axis.

10. The combination according to claim 9 wherein said sensing means comprises a phyiscal structure located in the flow of said fluid wholly downstream of said egress orifice, said physical structure being movable in response to flow of said fluid about said axis of said chamber and means for producing an electrical signal which is a function of movement of said structure in response to flow of said fluid about said axis.

11. The combination according to claim 10 further comprising a fluid flow passage in flow communication with and coaxial of said egress orifice, said physical structure being located wholly in said fluid flow passage.

12. In a fluid vortex device having a vortex chamber, said vortex chamber having an axis, fluid in said chamber being responsive to external motivation to produce a rotational velocity of said fluid about said axis, means for supplying said fluid to said chamber with substantially no rotational velocity, relative to said chamber about said axis and at a relatively large radius of said chamber, fluid outlet means located axially of said chamber and including egress orifice means having a radius smaller than said relatively large radius by a large factor, and sensing means being responsive substantially only to said rotational velocity of said fluid in said chamber about said axis in terms of a function of fluid and flow parameters, said sensing means including means for providing an electrical signal representative substantially only of said rotational velocity of said fluid in said chamber about said axis, wherein said sensing means comprises a physical structure located in the flow of said fluid downstream of said egress orifice, said physical structure being movable in response to flow of said fluid about said axis of said chamber and means for producing an electrical signal which is a function of movement of said structure in response to flow of said fluid about said axis, and wherein said physical structure member is responsive to sense and amplitude of rotational velocity of said fluid.

13. In a fluid vortex device having a vortex chamber, said vortex chamber having an axis, fluid in said chamber being responsive to external motivation to produce a rotational velocity of said fluid about said axis, means for supplying said fluid to said chamber with substantially no rotational velocity relative to said chamber about said axis and at a relatively large radius of said chamber, fluid outlet means located axially of said chamber and including egress orifice means having a radius smaller than said relatively large radius by a larger factor, and sensing means responsive only to a rotational velocity of said fluid in said chamber about said axis, said sensing means being responsive only to said rotational velocity of said fluid in said chamber about said axis in terms of a function of fluid and flow parameters, wherein is included at least one source of tangential control fluid flow into said chamber from externally of said chamber, said at least one source being arranged to induce rotational motion of said fluid in said chamber and constituting at least in part said external motivation, said sensing means including means for generating an electrical signal representative substantially only of said rotational velocity of said fluid in said chamber.

14. The combination according to claim 13 wherein said sensing means comprises a physical structure located in the flow of said fluid downstream of said egress orifice, said physical structure being movable in response to flow of said fluid about said axis of said chamber and means for producing an electrical signal which is a function of movement of said structure in response to flow of said fluid about said axis.

15. In a fluid vortex device having a vortex chamber, said vortex chamber having an axis, fluid in said chamber being responsive to external motivation to produce a rotational velocity of said fluid about said axis, means for supplying said fluid to said chamber with substantially no rotational velocity relative to said chamber about said axis and at a relatively large radius of said chamber, fluid outlet means located axially of said chamber and including egress orifice means having a radius smaller than said relatively large radius by a large factor, and sensing means being responsive substantially only to said rotational velocity of said fluid in said chamber about said axis in terms of a function of fluid and flow parameters, said sensing means including means for providing a signal representative substantially only of said rotational velocity of said fluid in said chamber about said axis, said vortex chamber having an end wall member lying in a plane perpendicular to said axis of said chamber, and wherein said means for supplying said fluid includes means for supplying fluid directly into said chamber through the plane of said wall about the outer periphery thereof so that said fluid flows into said chamber in a path parallel to said axis.

16. In a fluid vortex device having a vortex chamber, said vortex chamber having an axis, fluid in said chamber being responsive to external motivation to produce a rotational velocity of said fluid about said axis, means for supplying said fluid to said chamber with substantially no rotational velocity relative to said chamber about said axis and at a relatively large radius of said chamber, fluid outlet means located axially of said chamber and including egress orifice means having a radius smaller than said relatively large radius by a larger factor, said fluid outlet means having a passage extending from said egress orifice and through which is adapted to flow substantially along the axis of said passage; and sensing means responsive substantially only to said rotational velocity of said fluid in said chamber about said axis in terms of a function of fluid and flow parameters, said sensing means including a blade element, said blade element being positioned wholly within said passage substantially parallel to the axis of said passage; and means operable to produce a signal indicative of the pressure differential across said blade element as a result of the rotational velocity of said fluid flow relative to the axis of said passage.

References Cited

UNITED STATES PATENTS

| | | | |
|---|---|---|---|
| 2,515,447 | 9/1940 | Kollsman. | |
| 2,750,798 | 6/1956 | Ruskin et al. | 73—204 |
| 2,794,341 | 6/1957 | Vonnegut | 73—194 |
| 2,887,879 | 5/1959 | Vonnegut | 73—204 |
| 2,906,121 | 9/1959 | Knauth | 73—229 |
| 3,063,295 | 11/1962 | Dowdell | 73—194 |
| 3,164,017 | 1/1965 | Karlby et al. | 73—231 |

FOREIGN PATENTS 186,574    6/1906    Germany.

RICHARD C. QUEISSER, Primary Examiner.

EDWARD D. GILHOOLY, Assistant Examiner.

U.S. Cl. X.R.

73—505